US012791796B2

(12) United States Patent
Guan et al.

(10) Patent No.: US 12,791,796 B2
(45) Date of Patent: Nov. 10, 2026

(54) DEVICE FOR TRANSMITTING DATA FROM SOLID CORE OPTICAL FIBERS TO A HOLLOW CORE FIBER AND METHOD OF USE THEREOF

(71) Applicant: Microsoft Technology Licensing, LLC, Redmond, WA (US)

(72) Inventors: Binbin Guan, Issaquah, WA (US); Denizcan Billor, Seattle, WA (US); Jamie Dorea Gaudette, Kirkland, WA (US); Yawei Yin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 384 days.

(21) Appl. No.: 18/374,681

(22) Filed: Sep. 29, 2023

(65) Prior Publication Data

US 2025/0110281 A1 Apr. 3, 2025

(51) Int. Cl.

| | |
|---|---|
| ***G02B 6/32*** | (2006.01) |
| ***G01M 11/00*** | (2006.01) |
| ***G02B 6/293*** | (2006.01) |
| ***G02B 27/09*** | (2006.01) |
| ***G02B 27/28*** | (2006.01) |

(52) U.S. Cl.

CPC ........... *G02B 6/32* (2013.01); *G01M 11/3154* (2013.01); *G02B 6/2938* (2013.01); *G02B 27/0927* (2013.01); *G02B 27/283* (2013.01)

(58) Field of Classification Search

CPC ........................................................ G02B 6/32
USPC ............................................................ 385/33
See application file for complete search history.

(56) References Cited

U.S. PATENT DOCUMENTS

| | | | | |
|---|---|---|---|---|
| 5,115,814 A * | 5/1992 | Griffith | A61B 5/06 | 600/463 |
| 5,176,140 A * | 1/1993 | Kami | B06B 1/0644 | 600/459 |
| 5,682,412 A * | 10/1997 | Skillicorn | H05G 1/10 | 378/113 |
| 6,599,239 B2 * | 7/2003 | Hayakawa | A61B 1/00071 | 600/140 |
| 6,687,010 B1 * | 2/2004 | Horii | G01B 9/0205 | 356/479 |

(Continued)

FOREIGN PATENT DOCUMENTS

| | | | | |
|---|---|---|---|---|
| EP | 2579483 A1 | | 4/2013 | |
| WO | WO-03005621-A10 | * | 1/2003 | H04J 14/02216 |

OTHER PUBLICATIONS

International Search Report; International Application No. PCT/US2024/043936; International Filing Date: Aug. 27, 2024; Date of mailing: Dec. 6t, 2024; 15 pages.

(Continued)

*Primary Examiner* — Kaveh C Kianni
(74) *Attorney, Agent, or Firm* — Foley IP Law, PLLC

(57) ABSTRACT

A device for transmitting data from a plurality of solid core optical fibers to a hollow core fiber comprises a multiplexer; a first 4F optical system that is operative to receive the light output from the multiplexer; an amplifier disposed downstream of the first 4F optical system and upstream of a second 4F optical system, where the second 4F optical system is operative to receive amplified light output from the amplifier and output the amplified light to the hollow core fiber in a form that is compatible with the hollow core fiber.

20 Claims, 2 Drawing Sheets

(56) References Cited

U.S. PATENT DOCUMENTS

| | | | | |
|---|---|---|---|---|
| 7,539,362 | B2 * | 5/2009 | Teramura | G01N 21/4795 385/12 |
| 9,780,872 | B2 * | 10/2017 | Ren | H04B 10/1121 |
| 2001/0007917 | A1 * | 7/2001 | Hayakawa | A61B 1/00071 600/920 |
| 2003/0011769 | A1 * | 1/2003 | Rakuljic | G02B 6/29398 356/328 |
| 2003/0020922 | A1 * | 1/2003 | Crowley | A61B 5/6852 356/479 |
| 2004/0109164 | A1 * | 6/2004 | Horii | G01B 9/0201 356/479 |
| 2006/0132791 | A1 * | 6/2006 | Toida | A61B 5/0066 356/479 |
| 2006/0241493 | A1 * | 10/2006 | Feldman | A61B 1/00183 600/476 |
| 2006/0244973 | A1 * | 11/2006 | Yun | G01B 9/02004 356/497 |
| 2006/0255250 | A1 * | 11/2006 | Chong | G02B 26/0858 250/221 |
| 2007/0078305 | A1 * | 4/2007 | Teramura | G01B 9/02021 600/139 |
| 2007/0232902 | A1 * | 10/2007 | Teramura | A61B 5/6852 600/425 |
| 2007/0239032 | A1 * | 10/2007 | Milner | A61B 1/00172 600/476 |
| 2007/0287920 | A1 * | 12/2007 | Sawada | B06B 1/067 600/463 |
| 2008/0078939 | A1 * | 4/2008 | Hennessy | A61B 6/4233 348/E5.086 |
| 2013/0088771 | A1 * | 4/2013 | Li | H01S 3/2308 359/341.1 |
| 2017/0315054 | A1 * | 11/2017 | Lukens | G01B 9/02003 |
| 2021/0127969 | A1 * | 5/2021 | Oggenfuss | A61B 3/132 |
| 2022/0003540 | A1 * | 1/2022 | Williams | G01B 9/02019 |
| 2022/0182741 | A1 * | 6/2022 | Jinno | G02B 6/3512 |
| 2022/0229248 | A1 * | 7/2022 | Budnicki | H01S 3/0057 |

OTHER PUBLICATIONS

Nakazawa, et al., "Measurement of Mode Coupling Distribution Along a Few-Mode Fiber Using a Synchronous Multi-Channel OTDR," Optics Express, vol. 22, No. 25, Dec. 11, 2014, pp. 31299-31309.

International Preliminary Report on Patentability Chapter 1 received for PCT Application No. PCT/US2024/043936, Apr. 9, 2026, 08 pages.

* cited by examiner

DEVICE FOR TRANSMITTING DATA FROM SOLID CORE OPTICAL FIBERS TO A HOLLOW CORE FIBER AND METHOD OF USE THEREOF

BACKGROUND

Optical fibers are often used in data transmission applications, over both short and long distances. Optical fibers having a solid waveguiding core are configured for the propagation of a single optical mode (single mode or SM fiber) or multiple optical modes (multimode or MM fiber). Data transmission using a solid waveguiding core is typically conducted at 1550 nm, where silica has its lowest loss so that signals can be propagated over long distances with the minimum attenuation. Optical fibers for carrying data signals can be packaged into cables including one or more fibers within an outer jacket that protects the fibers during deployment and use of the fibers.

When a cable has been installed to enable optical communication along a desired pathway, the optical fibers within the cable need to be optically and mechanically coupled to equipment at either end of the pathway, including optical transmitters and optical receivers to generate and detect optical signals. Conventionally, for solid core single mode fiber the connections are achieved by splicing each end of each fiber of the cable to corresponding fibers of the transceiver equipment in a permanent bonded joint, or by fitting mechanical connectors to the cable fiber ends (connectorization) which can be engaged with similar connectors fitted onto fibers of the transceiving equipment. Spliced connections necessarily are made at the point of use, after a cable has been installed. Connectors can be attached either before or after cable installation. Both connectorization and splicing are widely used and enable connections to be made rapidly and at low cost.

The growth of global data traffic has brought into sight the fundamental limits of optical fibers with solid waveguiding cores. With data transmission appetites of emerging technologies such as large-scale data centers and 5G networks growing, demands for a new generation of optical fibers with superior performance are being made. Hollow core optical fibers are an attractive option for meeting many of these needs.

Hollow core fibers provide an alternative to conventional solid core fibers by guiding light in air instead of glass. This enables data transmission at near-vacuum light speeds, at higher optical powers and over broader optical bandwidths, with relative freedom from issues such as nonlinear and thermo-optic effects that can affect optical waves travelling in solid material. Hollow core fibers can be packaged into cable formats deployable for optical data transmission in the same way as conventional fibers but are not directly compatible with existing transceiver equipment configured for connection to solid core fibers.

SUMMARY

In an embodiment, a device for transmitting data from a plurality of solid core optical fibers to a hollow core fiber comprises a multiplexer; a first 4F optical system that is operative to receive the light output from the multiplexer; an amplifier disposed downstream of the first 4F optical system and upstream of a second 4F optical system, where the second 4F optical system is operative to receive amplified light output from the amplifier and output the amplified light to the hollow core fiber in a form that is compatible with the hollow core fiber. The multiplexer is operative to select between a plurality of inputs received from the plurality of solid core optical fibers and transmits one of these inputs as a light output. The first 4F operative system comprises a first diverging lens and a first converging lens. The amplifier is operative to amplify light output from the first 4F optical system and the second 4F optical system comprises a second diverging lens and second converging lens; and where at least one of the first 4F optical system or the second 4F optical system are free-space systems that transmit light unbounded by a waveguide.

In another embodiment, a device for transmitting data from a hollow core fiber to a plurality of solid core optical fibers comprises a third 4F optical system that is operative to receive the light output from the hollow core fiber; an amplifier disposed downstream of the third 4F optical system where the amplifier is operative to amplify light output from the third 4F optical system; and an attenuator that is disposed downstream of the amplifier. The third 4F operative system comprises a third diverging lens and a third converging lens; where the third 4F optical system is a free-space system where light is transmitted unbound by a waveguide and the attenuator is operative to reduce light output intensity to match that of the plurality of solid core optical fibers.

In another embodiment, a method for transmitting data from a plurality of solid core optical fibers to a hollow core fiber comprises transmitting a plurality of input light signals to a multiplexer from the plurality of solid core optical fibers. A single light signal output is transmitted from the multiplexer to a first 4F light system, where the first 4F light system comprises a first diverging lens and a first converging lens. The light signal is transmitted from the first 4F light system to an optical amplifier, which amplifies the light signal obtained from first 4F light system. The amplified light signal is transmitted to a second 4F light system; where the second 4F light system is operative to receive amplified light output from the amplifier and output the amplified light to the hollow core fiber in a form that is compatible with the hollow core fiber. The second 4F optical system comprises a second diverging lens and second converging lens. At least one of the first 4F optical system or the second 4F optical system are free-space systems that transmit light unbounded by a waveguide.

In yet another embodiment, a method for transmitting data from a hollow core fiber to a plurality of solid core optical fibers comprises transmitting an optical signal from the hollow core fiber to a third 4F optical system. The third 4F operative system comprises a third diverging lens and a third converging lens; where the third 4F optical system is a free-space system where light is transmitted unbound by a waveguide. The optical signal received from the third 4F optical system is amplified in an amplifier that is disposed downstream from the third 4F optical system. The light signal received from the amplifier in attenuated an attenuator; where the attenuator is operative to reduce signal intensity to match that of the plurality of solid core optical fibers. The light signal received from the attenuator is converted to a parallel data stream in a demultiplexer, where each stream in the parallel data stream can be transmitted to a solid core fiber in the plurality of solid core optical fibers.

DETAILED DESCRIPTION

Disclosed herein is an optical adaptor system that facilitates a data transmission from a network system that comprises solid core fibers to a network system that comprises a hollow core fiber. Disclosed herein too is a reverse optical adaptor system that facilitates data transmission from a network system that comprises a hollow core fiber to a network system that comprises solid core fibers. The optical adaptor system as well as the reverse optical adaptor system use a free-space design for data transmission from a plurality of single mode (or multimode) optical solid core fibers to a hollow core fiber or vice versa. The free-space design permits light to travel unbounded by a waveguide for a portion of the distance between the connector for the solid core fibers and the connector for the hollow core fiber. It permits the data from a solid core fiber to be transformed into a form that is compatible with a hollow core fiber and vice versa.

The optical adaptor system and the reverse optical adaptor system can be advantageously used in high power applications. Additionally, these systems are integrated with an optical supervisory channel (OSC) and an amplified optical time domain reflectometer (OTDR) to provide a powerful tool for monitoring and maintaining performance, ensuring reliable and efficient data transmission in a wide range of applications, including telecommunications, scientific research, and industrial processes.

In an embodiment, the optical adaptor comprises an assembly that comprises a first connector in optical communication with a plurality of optical solid core fibers, a second connector that is in optical communication with a hollow core fiber, a multiplexer, and a first free-space optical transmission system disposed downstream of the first connector and upstream of the second connector and in optical communication with both the first connector and the second connector.

The reverse optical adaptor comprises an assembly that comprises a third connector that is in optical communication with a hollow core fiber, a fourth connector in optical communication with a plurality of optical solid core fibers, a demultiplexer, and a second free-space optical transmission system disposed downstream of the third connector and upstream of the fourth connector and in optical communication with both the first connector and the second connector.

Figure 1:
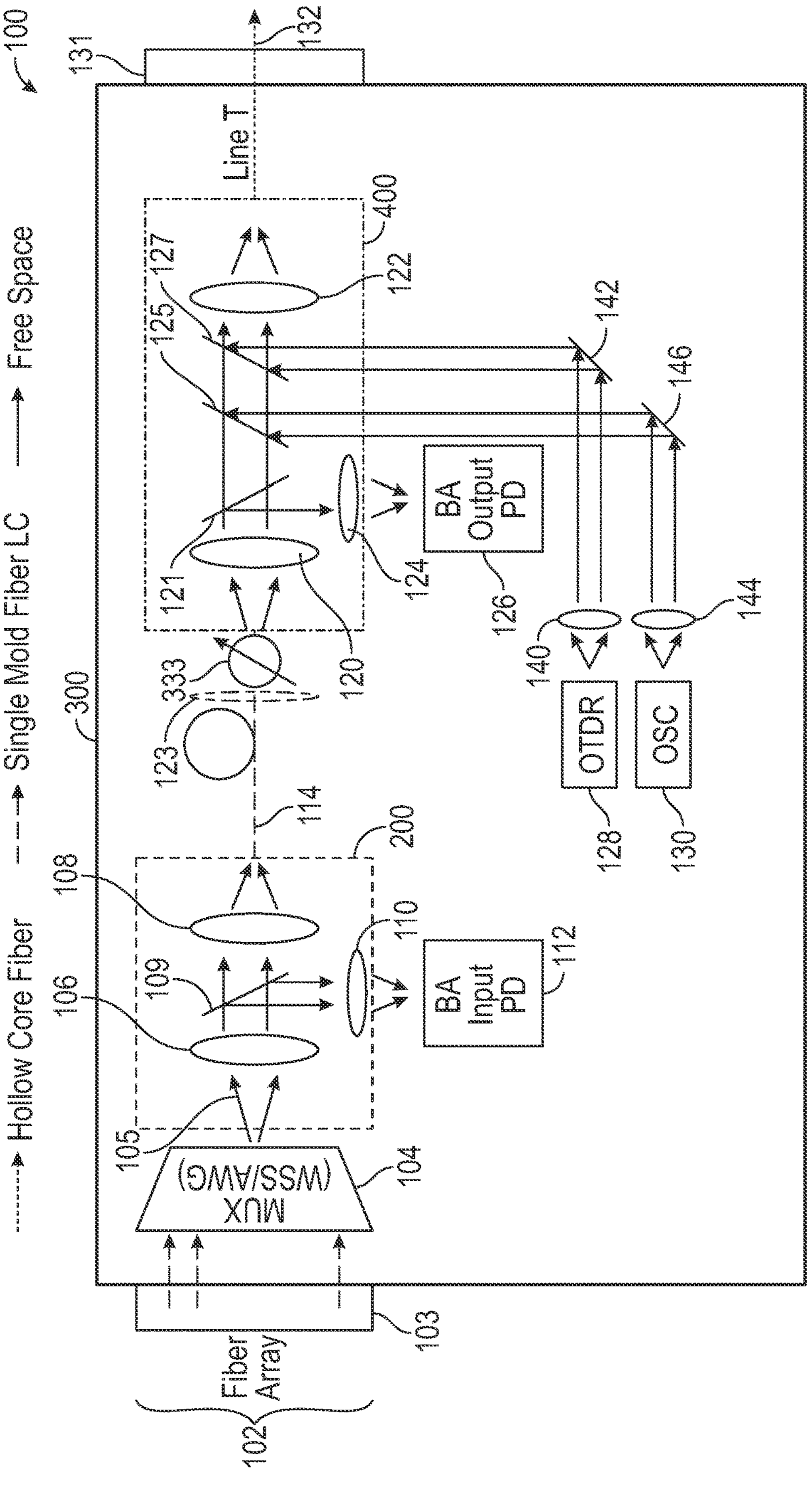
FIG. 1 is a depiction of an exemplary schematic device that transmits data from a plurality of solid core optical fibers to a hollow core fiber using free-space where light is unbounded by a waveguide.

FIG. 1 is an exemplary depiction of an optical adaptor 100 that comprises a first connector 103 that is in optical communication with a plurality of optical solid core fibers 102, an optical adaptor assembly housing 300 and a second connector 131 disposed on an opposing surface from the housing surface that contacts the first connector 103; where the second connector 131 is in optical communication with a hollow core fiber 132. The housing 300 comprises a plurality of free-space optical systems that facilitate a transmission of a data stream received at the first connector from the solid core fibers 102 to a hollow core fiber 132 that contacts the second connector 131. A hollow core fiber (HCF) varies from a conventional optical fiber (solid glass core fibers (SCF) that transmit light via single mode (SMF) or multimode (MMF)) by guiding light through a hollow region versus the glass core on which traditional fiber functions. The light beam is confined to the hollow core by holes in the surrounding glass material, which looks like a honeycomb in a cross-section. This means that only a minor portion of optical power moves through solid fiber material, typically glass. Otherwise, the light travels uninterrupted through air.

Disposed in the housing 300 downstream of the first connector 103 and upstream of the second connector 131 is a multiplexer 104, a plurality of 4F optical systems 200 and 400, and an optical amplifier 114 that is in optical communication with the first 4F optical system 200 and the second 4F optical system 400. A 4F optical system comprises a divergent element for diverging incident light, a convergence element for converging the incident light and a detector, with the divergent element, the convergence element and the detector are arranged on the same optical axis. In an embodiment, the divergent element, the convergence element and the detector are arranged on the same optical axis in sequence.

The first 4F optical system 200 is in optical communication with a first photodetector 112 that is operative to measure input power into the optical amplifier 114, while the second 4F optical system 400 (which lies downstream of the first optical system 200) is in optical communication with a second photodetector 126, an ODTR 128 and an OSC 130. The second photodetector 126, an ODTR 128 and an OSC 130 perform quality control functions for the optical adaptor 100. The second photodetector 126 measures power output from the optical amplifier 114. The OSC provides a continuous monitoring function that allows for real-time supervision of the system's performance, while the amplified OTDR measures the backscattered light from the fiber to identify any losses or failures in the fiber network. These will be discussed in detail later. Disposed downstream of the first 4F optical system 200 and upstream of the second 4F optical system 400 is the optical amplifier 114. In an embodiment, the optical amplifier 114 is an erbium doped optical solid core fiber. An isolator 123 and a variable attenuator 333 lie downstream of the optical amplifier 114. These serve to remove extraneous signals and attenuate the light output from the amplifier 114 to match that of the second 4F optical system respectively.

As noted above, the multiplexer 104 lies downstream of the first connector 103 which is contacted by a plurality of optical solid core fibers 102. The optical solid core fibers 102 comprise a solid waveguide core that can propagate data transmission in either single mode or multimode and receive data from a conventional transmitter. Conventional data transmitters are configured to propagate and transmit data to solid core fibers and this mode of contact remains the same for this disclosure.

The multiplexer 104 is in optical communication with the first connector 103 and uses wavelength division multiplexing (WDM) or dense wavelength division multiplexing (DWDM) to select between the plurality of inputs received from the plurality of solid core fibers 102 that contact the first connector 103. WDM comprises multiplexing a number of optical carrier signals onto a single optical fiber by using different wavelengths (i.e., colors) of laser light. The multiplexer transmits one of these inputs as an output in the form of a beam of light 105 to the first 4F optical system 200. DWDM works by combining and transmitting multiple signals simultaneously at different wavelengths on the same fiber.

4F optical systems generally comprise a divergent element (e.g., a diverging lens) for diverging incident light, a convergence element (e.g., a converging lens) for converging the incident light and a photodetector, with the divergent element, the convergence element and the photodetector are arranged to lie on the same optical axis. With reference once again to the FIG. 1, the first 4F optical system 200 comprises a first diverging lens 106 and a first converging lens 108. The first diverging lens 106 receives light from the multiplexer, while the first converging lens 108 receives light from the first diverging lens 106. The light travels unbounded and unguided by any solid guide between the first diverging lens 106 and the first converging lens 108 which therefore renders the system depicted in the FIG. 1 as being a free-space design. The free space between the first diverging lens 106 and the first converging lens 108 is termed the first free space.

Disposed downstream of the first diverging lens 106 and upstream of the first converging lens 108 is a first beam splitter 109. The first beam splitter 109 splits light in a transmission:reflection ratio of 90:10 to 99:1, preferably 95:5. The reflected beam from the beam splitter is directed to a first booster amplifier photodetector 112 via a converging lens 110. The first booster amplifier photodetector 112 provides a measure of signal quality transmitted by the multiplexer.

Light from the first converging lens 108 converges onto an optical amplifier 114. The optical amplifier 114 is preferably an erbium-doped solid core optical fiber that amplifies the light incident upon it via first converging lens 108. The erbium-doped solid core optical fiber efficiently amplifies light in the 1.5-μm wavelength region, where silica-based telecom fibers have their loss minimum. In an embodiment, the erbium-doped solid core optical fiber may be optically coupled with two laser diodes (LDs) (not shown) that provide the pump power for laser amplification via stimulated emission.

Located downstream of the optical amplifier are an isolator 123 and a variable attenuator 333. The optical isolator 123 is operative to permit light to travel in only one direction towards the variable attenuator 333 and away from the first 4F optical system. Light is therefore transmitted from the optical amplifier 114 to the second 4F optical system 400. The optical isolator 123 operates to prevent light from the OTDR 128 and OSC 130 from being transmitted through to the optical amplifier 114.

The variable attenuator 333 is located downstream of the isolator 123 and reduces light intensity to match that of the input light used by the second 4F optical system 400. The variable attenuator 333 tries to adjust light input to the second 4F optical system so that light output from the second 4F optical system can be transmitted through the hollow core fiber 132 with minimal distortion or aberration. In an embodiment, the variable attenuator is located downstream of the isolator 123 and upstream of the second 4F optical system 400 and is operative to match a light output from the second 4F optical system to that of a designated input for the hollow core fiber 132.

Light from the optical amplifier 114 is then transmitted to the second 4F optical system 400 via the variable attenuator 333. The second 4F optical system 400 comprises a second diverging lens 120 and a second converging lens 122. Disposed between the second diverging lens 120 and the second converging lens 122 are a plurality of beam splitters-second beam splitter 121, third beam splitter 125 and fourth beam splitter 127. The second beam splitter 121 is in optical communication with a second booster amplifier photodetector 126 via a converging lens 124. The second beam splitter 121 also splits light in a transmission:reflection ratio of 90:10 to 99:1, preferably 95:5. The reflected beam from the second beam splitter is directed to the second booster amplifier photodetector 126 via a converging lens 124. The second booster amplifier photodetector 124 provides a measure of signal quality transmitted by the optical amplifier 114. In an embodiment, the signal quality from the second booster amplifier photodetector 124 can be compared with signal quality from the first booster amplifier photodetector 112 to ascertain the quality of signal amplification by the optical amplifier 114.

The amplified OTDR 128 measures the backscattered light from the fiber to identify any losses or failures in the fiber network. The OSC 130 provides a continuous monitoring function that allows for real-time supervision of the system's performance. Both the OTDR and OSC are quality control devices that measure system performance.

The optical time-domain reflectometer (OTDR) 128 is an optoelectronic instrument used to characterize the light transmission in free space between the second diverging lens 120 and the second converging lens 122. The OTDR 128 injects a series of optical pulses into the free space between the second diverging lens 120 and the second converging lens 122. The light is transmitted into the free space via lens 140 and reflector 142 to the fourth beam splitter 127. At the fourth beam splitter 127, light transmitted from the second diverging lens 120 interacts with the incident pulsed light beam from the OTDR 128. This interaction results in light that is scattered (Rayleigh backscatter) or reflected back to the OTDR 128. The scattered or reflected light that is gathered back at the OTDR 128 is used to characterize the transmission in the second free space between the second diverging lens 120 and the second converging lens 122. The strength of the return pulses is measured and integrated as a function of time. It may be plotted as a function of the length of the second free space, where the length of the second free space is the distance between the second diverging lens 120 and the second converging lens 122. It may also be used to identify any losses or failures in the optical amplifier 114 and the plurality of optical fibers 102 in the fiber network. The use of amplified OTDR enables measuring up to a 30 dB dynamic range thus making it highly sensitive to changes in the fiber network. This allows for accurate detection and localization of faults and other issues in the system, making it easier to maintain and troubleshoot.

The optical supervisory channel (OSC) 130 also functions in much the same manner as the OTDR 128 and provides a continuous monitoring function that allows for real-time supervision of the devices' performance. (OSC) comprises a channel that is accessed at an optical line amplifier site and that is used for maintenance purposes including remote site alarm reporting and communications desirable for fault location. This data channel uses an additional wavelength usually outside the erbium doped fiber amplification (EDFA) band (at 1,510 nm, 1,620 nm, 1,310 nm or another proprietary wavelength). The OSC carries information about the multi-wavelength optical signal as well as remote conditions at the optical terminal or EDFA site.

The OSC signal is transmitted by OSC 130 to the third beam splitter 125 via lens 144 and reflector 146. It interacts with light transmitted from the second diverging lens 120 at the third beam splitter 125. This interaction results in light that is reflected back to the OSC 130, where it can be used for maintenance purposes and for real-time supervision of the system's performance. The use of a coherent OSC enables real-time polarization-diversified measurement, as well as measurement of polarization mode dispersion (PMD). This provides an accurate measurement of both polarization-dependent losses and PMDD, thereby helping to optimize the performance of the system and ensure high-quality data transmission.

It is to be noted that the third and fourth beam splitters 125 and 127 are prevented from transmitting any of the light incident upon them (from the OTDR 128 and/or the OSC 130) by the isolator 123 as detailed above.

The light transmitted by the second converging lens 122 is then directed to the second connector 131 where it is transmitted to the hollow core fiber 132. The hollow core fiber 132 may be part of a network (not shown).

The optical adaptor 100 is advantageous in that it can transmit data from a plurality of single mode or multimode solid core optical fibers (fiber array 102) to a hollow core fiber 132 without any data loss. One major advantage is that there is no index mismatch between the single mode fiber and the hollow-core fiber, which allows for direct coupling of the hollow core fiber connector at the end of the line system to another hollow core fiber connector with minimal reflection. Additionally, free space has the advantage of being able to handle high power applications with low nonlinearity, which makes it suitable for a wide range of applications.

Figure 2:
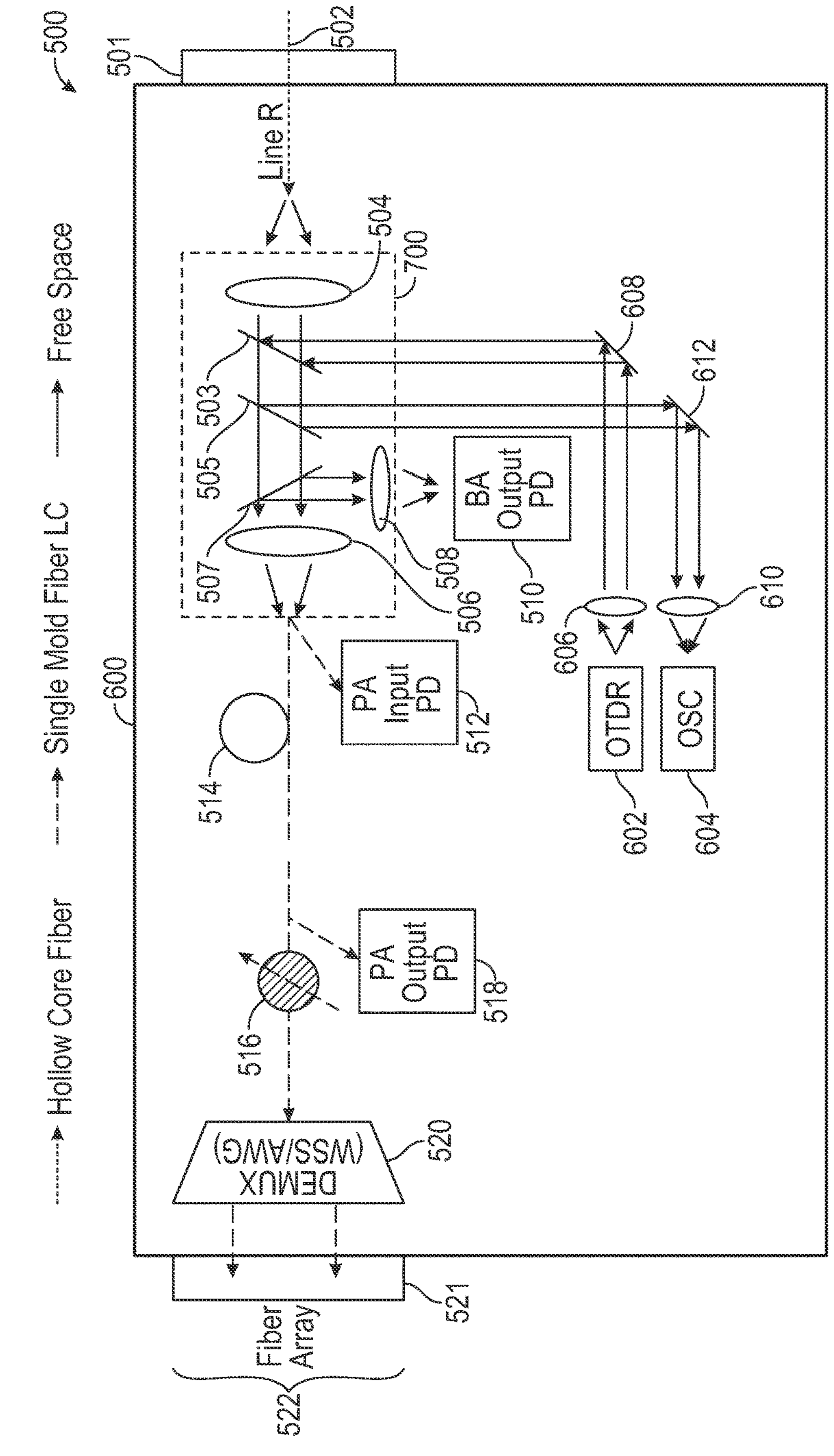
FIG. 2 is a depiction of an exemplary schematic device that transmits data from a hollow core fiber to a plurality of solid core optical fibers using free-space where light is unbounded by a waveguide.

FIG. 2 depicts an exemplary reverse optical adaptor 500 that comprises a third connector 501 disposed on an outer surface of a housing 600. The reverse optical adaptor 500 transmits data from a hollow core fiber 502 to a plurality of solid core optical fibers 522 after filtering out the added optical signals from OTDR and OSC that are added as detailed in the FIG. 1. The filtered optical signal is then amplified in an erbium-doped fiber amplifier. The amplified signal is then attenuated to adjust the optical signal to match the receiver signal.

The third connector 501 is in optical communication with a hollow core fiber 502 that transmits data to a plurality of solid core fibers 522 (that propagate light in single mode or multimode) that contact the housing 600 via a fourth connector 521. In an embodiment, the third connector 501 is disposed on an opposing surface of the housing 600 from the surface that contacts the fourth connector 521.

Light from the hollow core fiber is incident on a third 4F optical system 700. The third 4F optical system 700 comprises a third diverging lens 504 and a third converging lens 506 between which are disposed a fifth beam splitter 503, a sixth beam splitter 505 and seventh beam splitter 507. The third 4F optical system 700 also comprises a free space design. The light travels unbounded and unguided by any solid guide (such as, for example, a waveguide) between the third diverging lens 504 and a third converging lens 506. The free space between the third diverging lens 504 and a third converging lens 506 is termed the third free space.

The third diverging lens 504 lies upstream of the fifth beam splitter 503, the sixth beam splitter 505, the seventh beam splitter 507 and the third converging lens 506. The fifth beam splitter 503 lies upstream of the sixth beam splitter 505, which in turn lies upstream of the seventh beam splitter 507. The fifth beam splitter 503 is in optical communication with the second OTDR 602 via reflector 608 and lens 606, while the sixth beam splitter 505 is in optical communication with the second OSC via reflector 612 and lens 610. Since the function and utility of the OTDR and OSC are already detailed above, they will not be elaborated upon again in the interests of brevity. The fifth beam splitter 503 and the sixth beam splitter 505 are used to filter out the OTDR and OSC inputs that have been applied by the transmission optical adaptor 100 detailed in FIG. 1.

The seventh beam splitter 507 is in optical communication with a booster amplifier photodetector 510 via lens 508. The filtered light is then transmitted to a second (erbium doped fiber) amplifier 514 via the third convergence lens 506. The amplified signal produced in the second amplifier 514 is then attenuated in attenuator 516 to adjust the optical signal to match the receiver network signal (the network of solid core fibers). The second amplifier lies downstream of a first pre-amplifier photodetector 512 and upstream of a second pre-amplifier photodetector 518. The respective pre-amplifier photodetectors 512 and 518 are used to measure input and output signal quality of the second amplifier 514. The attenuated signal is then directed to the demultiplexer 520 where the attenuated single input from the second amplifier 514 is split into several separate outputs. The demultiplexer 520 takes one single input data line and then switches it to any one of a number of individual output lines one at a time. The demultiplexer 520 can convert a serial data signal received from the amplifier 514 (at the input) to a parallel data stream where each data stream can be directed to each of the solid core fibers in the plurality of solid core optical fibers 522. The plurality of solid core optical fibers 522 are in optical communication with the housing 600 via fourth connector 521.

In summary, data transmission can occur between solid core optical fibers and the hollow core fiber by using a free-space design where light can be transmitted between the two different types of fibers without being bounded by a waveguide. The free-space optical transmission system is operative to facilitate data transmission from the plurality of single mode (or multimode) optical solid core fibers to a hollow core fiber or vice versa with low losses.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

While the invention has been described with reference to some embodiments, it will be understood by those skilled in the art that various changes may be made, and equivalents may be substituted for elements thereof without departing from the scope of the invention. In addition, many modifications may be made to adapt a particular situation or material to the teachings of the invention without departing from essential scope thereof. Therefore, it is intended that the invention is not limited to the particular embodiments disclosed as the best mode contemplated for carrying out this invention, but that the invention will include all embodiments falling within the scope of the appended claims.

What is claimed is:

1. A device for transmitting data from a plurality of solid core optical fibers and a hollow core fiber comprising:

a multiplexer, operative to select between a plurality of inputs received from the plurality of solid core optical fibers and transmit one of these inputs as a light output;

a first 4F optical system, operative to receive the light output from the multiplexer, the first 4F optical system comprising a first diverging lens and a first converging lens, the first diverging lens and the first converging lens separated by free space such that the light output propagates unbounded by a waveguide between the first diverging lens and the first converging lens; and an amplifier disposed downstream of the first 4F optical system and upstream of a second 4F optical system, the amplifier operative to amplify the light output from the first 4F optical system, the second 4F optical system operative to receive amplified light from the amplifier through a variable optical attenuator and output the amplified light to the hollow core fiber by transforming the amplified light into a form compatible with propagation in the hollow core fiber, the second 4F optical system comprising a second diverging lens and a second converging lens, the second diverging lens and the second converging lens separated by free space such that the amplified light propagates unbounded by a waveguide between the second diverging lens and the second converging lens;

wherein at least one of the first 4F optical system and the second 4F optical system are free-space systems that transmit light unbounded by a waveguide.

2. The device of claim 1, where the first 4F optical system and the second 4F optical system are free-space systems.

3. The device of claim 1, where the first 4F optical system further comprises a first beam splitter in optical communication with a first booster amplifier photodetector; where the first beam splitter lies downstream of the first diverging lens and upstream of the first converging lens; and where the first booster amplifier photodetector measures signal quality of light received from the multiplexer.

4. The device of claim 3, where the first beam splitter splits light in a transmission:reflection ratio of 90:10 to 99:1.

5. The device of claim 3, where the second 4F optical system comprises a second beam splitter in optical communication with a second booster amplifier photodetector; where the second booster amplifier photodetector is operative to measure signal quality of light received from the amplifier.

6. The device of claim 5, where the second beam splitter splits light in a transmission:reflection ratio of 90:10 to 99:1.

7. The device of claim 5, where the second 4F optical system further comprises a third beam splitter that lies downstream of the second diverging lens and upstream of the second converging lens; where the third beam splitter is in optical communication with an optical supervisory channel; where the optical supervisory channel is operative to continuously monitor device performance.

8. The device of claim 7, where the second 4F optical system further comprises a fourth beam splitter that lies downstream of the second diverging lens and upstream of the second converging lens; where the fourth beam splitter is in optical communication with an optical time-domain reflectometer, where the optical time-domain reflectometer injects a series of optical pulses into a free space between the second diverging lens and the second converging lens; where the series of optical pulses interact with light received from the second diverging lens to provide information to the optical time-domain reflectometer about losses or failures in the amplifier.

9. The device of claim 1, where the amplifier comprises an erbium-doped single-mode fiber.

10. The device of claim 1, further comprising an isolator and a variable attenuator located downstream of the first 4F optical system and upstream of the second 4F optical system; where the isolator prevents reflected light from the second 4F optical system from entering the amplifier, and where the variable attenuator is located downstream of the isolator and upstream of the second 4F optical system and is operative to match a light output from the second 4F optical system to that of a designated input for the hollow core fiber.

11. The device of claim 1, further comprising a housing, where the housing surrounds the device and has a first connector and a second connector disposed on its outer surfaces; where the first connector is in optical communication with the plurality of solid core optical fibers, and where the second connector is in optical communication with the hollow core fiber.

12. The device of claim 1, wherein light propagates in free space between the diverging lens and the converging lens of the first 4F optical system without being guided by a waveguide.

13. The device of claim 1, further comprising an optical supervisory channel optically coupled to the second 4F optical system and configured to monitor performance of the device during operation.

14. The device of claim 1, further comprising an optical time-domain reflectometer optically coupled to a free-space region between the diverging lens and the converging lens of the second 4F optical system and configured to receive reflected or backscattered light.

15. The device of claim 1, further comprising an optical isolator disposed downstream of the amplifier and configured to inhibit propagation of reflected light toward the amplifier.

16. The device of claim 1, further comprising a variable optical attenuator disposed upstream of the second 4F optical system and configured to adjust optical power prior to transmission through the hollow-core fiber.

17. The device of claim 1, further comprising a housing containing the multiplexer, the first 4F optical system, the amplifier, and the second 4F optical system, the housing including a first connector configured to receive the plurality of solid-core optical fibers and a second connector configured to receive the hollow-core fiber.

18. The device of claim 1, wherein the free-space optical propagation occurs between optical components disposed within a housing of the device, and wherein the housing includes a first connector configured to receive the plurality of solid-core optical fibers and a second connector configured to receive the hollow-core fiber.

19. The device of claim 1, wherein the multiplexer is configured to operate using wavelength-division multiplexing or dense wavelength-division multiplexing.

20. The device of claim 1, wherein the device is further configured to transmit optical signals between the hollow-core fiber and a plurality of solid-core optical fibers using a free-space optical system.

* * * * *